US005341695A

United States Patent [19]

Avitan

[11] Patent Number: 5,341,695

[45] Date of Patent: Aug. 30, 1994

[54] MATERIAL HANDLING VEHICLE CARRIAGE HEIGHT MEASUREMENT

[75] Inventor: Isaac Avitan, Vestal, N.Y.

[73] Assignee: The Raymond Corporation, Greene, N.Y.

[21] Appl. No.: 832,457

[22] Filed: Feb. 7, 1992

[51] Int. Cl.[5] .......... G01F 15/02

[52] U.S. Cl. .......... 73/1 J

[58] Field of Search .......... 73/1 J, 3, 118.1, 865.8, 73/198; 364/424.07, 571.01, 571.02, 571.03; 414/529, 572, 631, 636

[56] References Cited

U.S. PATENT DOCUMENTS 4,152,922 5/1979 Francisco, Jr. .......... 73/3

4,942,529 7/1990 Avitan et al. .......... 364/424.01

*Primary Examiner*—Robert Raevis

*Attorney, Agent, or Firm*—Salzman & Levy

[57] ABSTRACT

The invention features a method and apparatus of determining the absolute and/or relative carriage height of a forklift truck having an extendable mast. The hydraulic fluid displacement is converted to electrical signals to obtain the carriage height. A hydraulic flow sensor has two proximity sensors to detect motion (i.e., the speed and direction) of the fluid and to provide an electrical signal. A conversion factor is applied to the signal to precisely determine the carriage height. The conversion factor compensates for the sensor asymmetrical flow and frequency characteristics, and for the fluid kinematic viscosity characteristics.

5 Claims, 5 Drawing Sheets

37
44
F / S Temp
38
F / S Lead
F / S Lag
39
Signal Condition
Buffer / Schmidt Trigger
Special Bootstrap Mode
+5V
ADC
IC3
IC2
RxD
TxD
MISO
DI
DI
Power Supply
+5V
RS - 485 Xciever
Optical Isolation
Diff. Driver
40
+12V
Gnd
RxD
TxD
A
A
B
B
34a
36a
Upper
Lower
Mast Ref. L / S
RS - 422 or RS - 485
42

MATERIAL HANDLING VEHICLE CARRIAGE HEIGHT MEASUREMENT

RELATED APPLICATION

This application is related to U.S. Pat. No. 4,942,529 issued to Isaac Avitan et al on Jul. 17, 1990, for Lift Truck Control Systems, bearing a common assignee, and whose teachings are hereby incorporated by reference.

FIELD OF THE INVENTION

The invention relates to a method and apparatus for measuring the height of a carriage of a forklift truck, and, more particularly, to determining the absolute and/or relative carriage height for a lift truck of the "order picker" type having an extendable mast.

BACKGROUND OF THE INVENTION

The measurement of carriage height in forklift vehicles is a critical parameter affecting speed and stability. In the aforementioned U.S. Pat. No. 4,942,529, it is disclosed that the height of the carriage of a forklift truck can be determined by measuring the hydraulic flow or displacement necessary to lift and lower the mast supporting the carriage. The fluid flow measurement is converted into electrical signals that are used to determine the height of the carriage of the lift truck from a home position. While the disclosure provides a viable means to accomplish the objectives outlined therein, the measurement of fluid flow comprises many complexities that were not addressed by the patent. These complexities affect the precision of the measurement and could in an extreme situation lead to an erroneous result.

The present invention has as one of its objectives to provide a method and apparatus for obtaining a more precise hydraulic flow measurement, and hence for determining the proper height of the carriage of the forklift vehicle.

One of the deficiencies of the fluid measurement was the failure to account for the variations introduced by reason of viscosity changes in the hydraulic fluid. Viscosity is a function primarily of temperature of the fluid.

It was also observed that the flow sensor output frequency will differ, depending on the rate and direction of the fluid flow. This is due to the mechanical construction of the sensor itself. In other words, the sensor is not truly bidirectional in its characteristics with regard to fluid flow.

The present invention seeks to compensate for changes of viscosity based on fluid temperature and for flow rate based on flow sensor frequency output.

The present invention also seeks to correct for the non-symmetrical operating characteristics of the fluid sensor itself.

It is an object of the present invention to determine absolute carriage height accurately by means of a flow sensor.

SUMMARY OF THE INVENTION

In accordance with the present invention, there is provided a method and apparatus of determining the absolute and/or relative carriage height of a forklift truck having an extendable mast. The hydraulic fluid displacement or flow rate through the flow sensor is converted to electrical signals to obtain the carriage height. A hydraulic flow sensing means comprises two proximity sensors to detect motion (speed and direction) of the fluid.

The sensors are located at an electrical phase angle of 90° with respect to each other. This results in an electrical sine wave pulse train pair (leading and lagging). The leading and lagging pulse signals are used to determine an instantaneous elevation reading for the carriage. The pulse train phase relationship of the sensors provides a determination of the fluid flow direction. The fluid flow direction influences the elevation reading, corrected by a conversion factor that precisely determines the carriage height, which is dependent on oil viscosity and flow sensor frequency output.

The apparatus also includes a temperature sensor located in the hydraulic fluid to measure the temperature of the hydraulic fluid and to provide a compensatory factor in determining the kinematic viscosity of the pumped liquid. Two spaced-apart reference switches are also provided along the path defining the carriage travel (i.e., along the extendable mast). These reference switches provide the means for recalibrating or synchronizing the lift height. In the learning mode, the reference switches are used to determine the appropriate conversion factor(s) in both directions for later use in actual measurements for the specific oil type and vehicle characteristics.

The method of the invention comprises the first step of reading the absolute height last determined by the apparatus. Next, the temperature of the hydraulic fluid is measured to determine the kinematic viscosity of the fluid. The flow sensors are read next to obtain a quadrature increment indicative of flow rate and flow direction. The ratio of pulse rate to kinematic viscosity is then computed. The flow direction indicates whether the carriage is ascending/descending along the mast. A conversion factor is then computed or looked up to obtain the relative incremental/decremental height. The incremental/decremental height is then added or subtracted from the initial height reading to obtain a new absolute height value. The new value is stored, and the routine is exited until further notice.

BRIEF DESCRIPTION OF THE DRAWINGS

A complete understanding of the present invention may be obtained by reference to the accompanying drawings, when considered in conjunction with the subsequent detailed description, in which.

For the purposes of brevity and clarity, similar elements and components will bear the same designation throughout the figures.

DESCRIPTION OF THE PREFERRED EMBODIMENT

Generally speaking, the invention features a method and apparatus for determining the height of a carriage of a material handling vehicle of the "order picking" type. It has been previously demonstrated in the aforementioned U.S. Pat. No. 4,942,529 that the height of a carriage of such a material handling vehicle can be determined by measuring the hydraulic fluid flow rate in raising and lowering the carriage. The prior teaching, while suggesting a viable means to accomplish the result, nevertheless had neglected to consider some of the parameters for making the height determination more accurate.

The present invention addresses the additional parameter of fluid viscosity variation with respect to oil temperature. Another parameter utilized in the present invention relates to flow sensor frequency variation with respect to the hydraulic flow rate of oil, compensating for the non-linearity in the frequency of the flow sensor. A third parameter of the present invention addresses and compensates for the asymmetry of the flow sensor as a function of the direction of fluid flow with respect thereto. In addition, the present invention also incorporates the learning technique, disclosed in the aforementioned patent, for referencing a unit distance-per-pulse by representing a predetermined volume of fluid. The foregoing parameters all directly affect the precision of the calculation of the carriage height.

Figure 1:
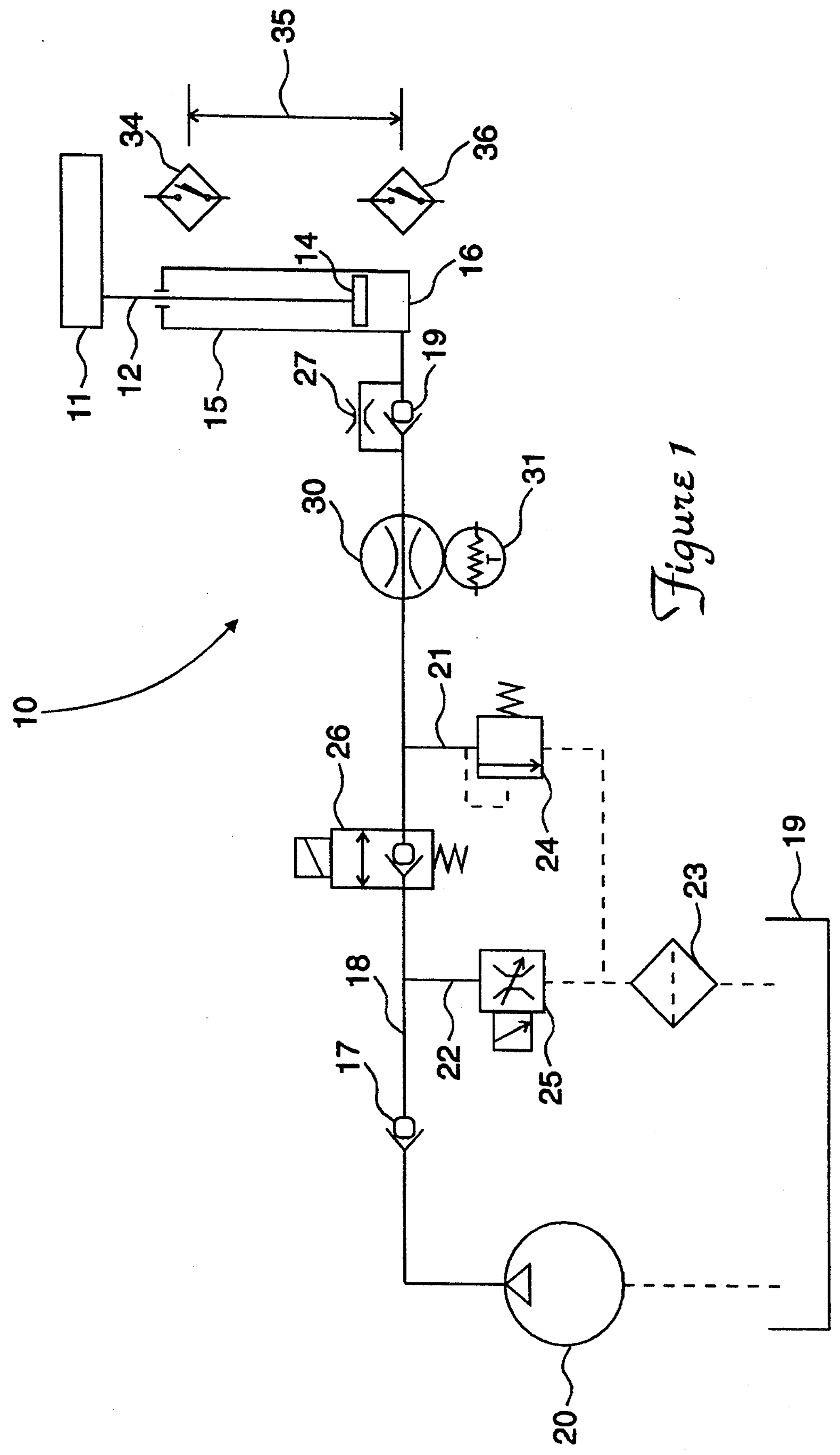
FIG. 1 is a schematic view of the hydraulic circuit of the invention.

Now referring to FIG. 1, a schematic hydraulic circuit 10 for accomplishing the vertical movement of the carriage 11 is shown. The carriage 11 is disposed upon the end of a vertical mast 12 that is connected to the piston 14 of a hydraulic cylinder 15. Fluid for moving the piston enters the fluid chamber 16 of the cylinder 15 through hydraulic line 18. The fluid is pumped through line 18 to cylinder 15 by means of a hydraulic pump 20. The pump 20 draws the hydraulic fluid from reservoir 19 when the carriage 11 is to be lifted. The fluid is forced out of cylinder 15 back into reservoir 19 when the carriage 11 is lowered.

The fluid returns to the reservoir 19 via two pathways 21 and 22, respectively. A filter 23 cleans the returning fluid. A pressure relief valve 24 in line 21 allows the fluid to return to the reservoir 19 when hydraulic pressure exceeds design threshold conditions. The fluid normally returns to reservoir 19 via line 22 when the carriage 11 is to be lowered. Normally returning fluid will pass through the load holding valve 26 and the proportional lowering valve 25, which are opened for returned fluid. A flow sensor 30 disposed in flow line 18 monitors the fluid flow into and out of the cylinder 15, in order to calculate the height of the carriage 11. A fluid temperature sensor 31 is associated with the flow sensor 30 for determining the kinematic viscosity of the fluid. Check valves 17 and 19, respectively, are disposed in line 18 to prevent backflow of the fluid within the line. Flow restriction 27 limits the maximum allowable lowering speed of carriage 11.

Two reference switches 34 and 36, respectively, are located along the path of travel 35 of the mast 12 of cylinder 15. The distance between reference switches 34 and 36 is known and fixed. These two mast reference points are used to reference the unit distance-per-pulse of a specified oil and vehicle type by representing a predetermined amount of pumped fluid between them, proportional to a given number of electrical pulses. These two switches 34 and 36 also provide a means by which the height measurement can be recalibrated or synchronized with the carriage height.

Figure 2:
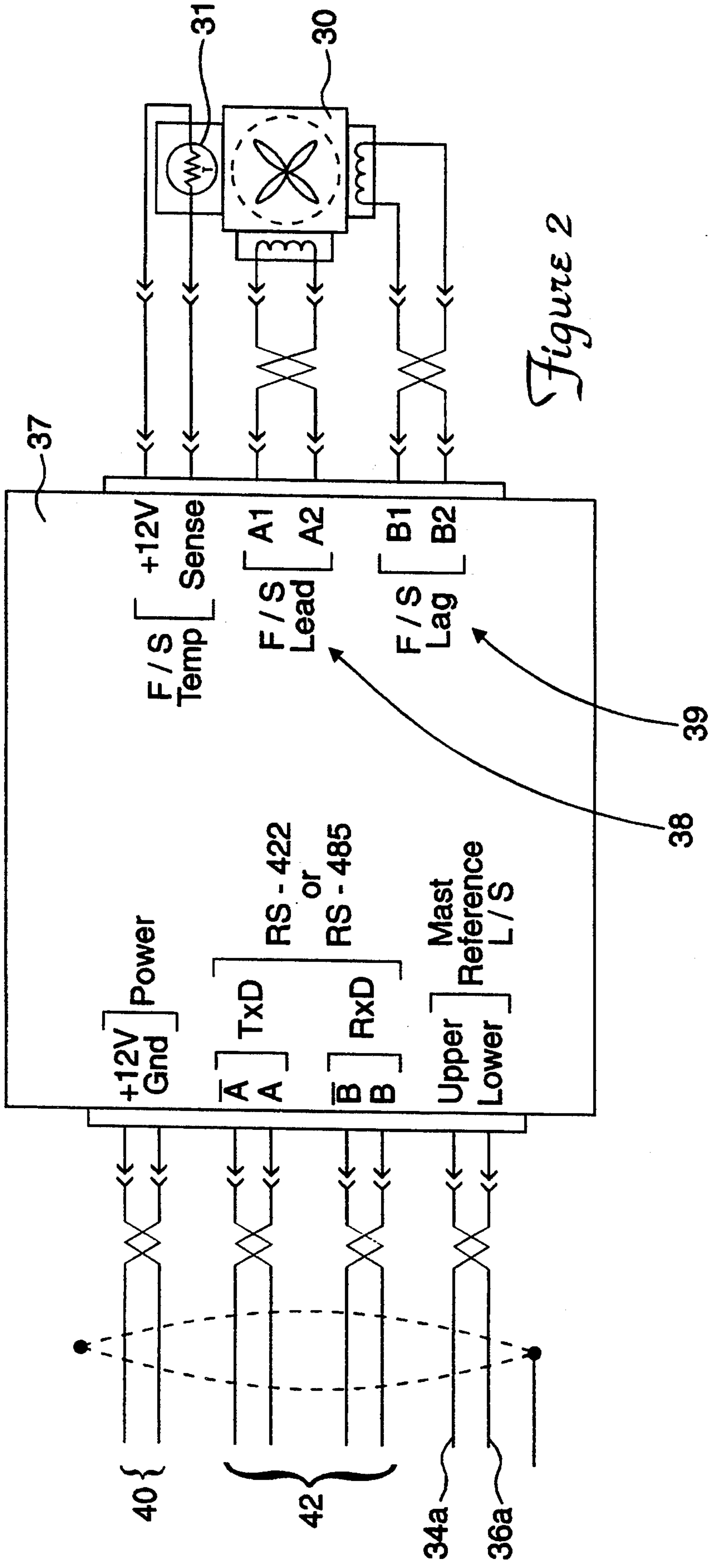
FIG. 2 is a block diagram schematic view of the flow sensor control module used in conjunction with the hydraulic circuit of FIG. 1 to calculate the relative height of the carriage.

Referring now also to FIG. 2, a flow sensor control module 37 is illustrated. The flow sensor control module 37 converts the readings from the flow sensor 30 and the temperature sensor 31 into electrical signals for calculating the height of carriage 11 (FIG. 1). The signals from the flow sensor 30 are distinguished by leading 38 and lagging 39 signals, which indicate whether the carriage is moving up or down. The calculation for the height of the carriage 11 depends upon the direction of movement of the fluid. The conversion factor for determining the carriage height is non-linear and will vary with the temperature, the direction and the velocity of the fluid flow.

The flow sensor 30 comprises two proximity sensors having a phase angle of 90° therebetween. The flow sensor 30 measures the leading and lagging flow rate, to indicate whether the carriage 11 is being raised or lowered.

The electrical pulses, provided by control module 37 as a function of the fluid flow, are counted and the value is correlated by means of the conversion factor, to accurately determine the height of the carriage 11.

The mast 12 of cylinder 15 (FIG. 1) has a known cross-sectional area, which is used together with the volumetric capacity determination to calculate carriage height.

The temperature sensor 31 is used to correct for changes in kinematic viscosity of the fluid, as aforementioned. One type of temperature sensor that can be used for this purpose is a Model TD4A sensor, available from the Micro Switch Corporation.

The two reference switches 34 and 36 (FIG. 1), disposed along the path 35 of the mast travel provide signals 34*a* and 36*a*, respectively (FIG. 2). These signals are used in two ways: in the learn mode to determine the accumulated flow sensor pulses between the switches having known displacement from one another and reference the particular fluid/vehicle characteristics; and to recalibrate or synchronize height measurement during normal operation.

Power is provided by means of lines 40, which provide a 12 volt and a ground potential.

Control module 37 is adapted to interface to a host, not shown, over bidirectional communications receive and transmit channel 42 configured in the form of an RS-485 or an RS-422 serial communications bus. The receiver portion of communications channel 42 can be used to interrogate control module 37 as to status of control module 37 itself or of any flow sensor 30, temperature sensor 31, limit switches 34 and 36 (FIG. 1), or any other components attached to control module 37. Responses to such interrogations can be provided over the transmit portion of communications channel 42. The carriage height reported over communications channel 42 is in absolute form, directly usable downstream in further processing, as hereinbelow described.

It should be understood that flow sensor control module 37 can also serve as a feedback mechanism servicing closed-loop velocity and/or position controllers in appropriate applications.

Figure 3:
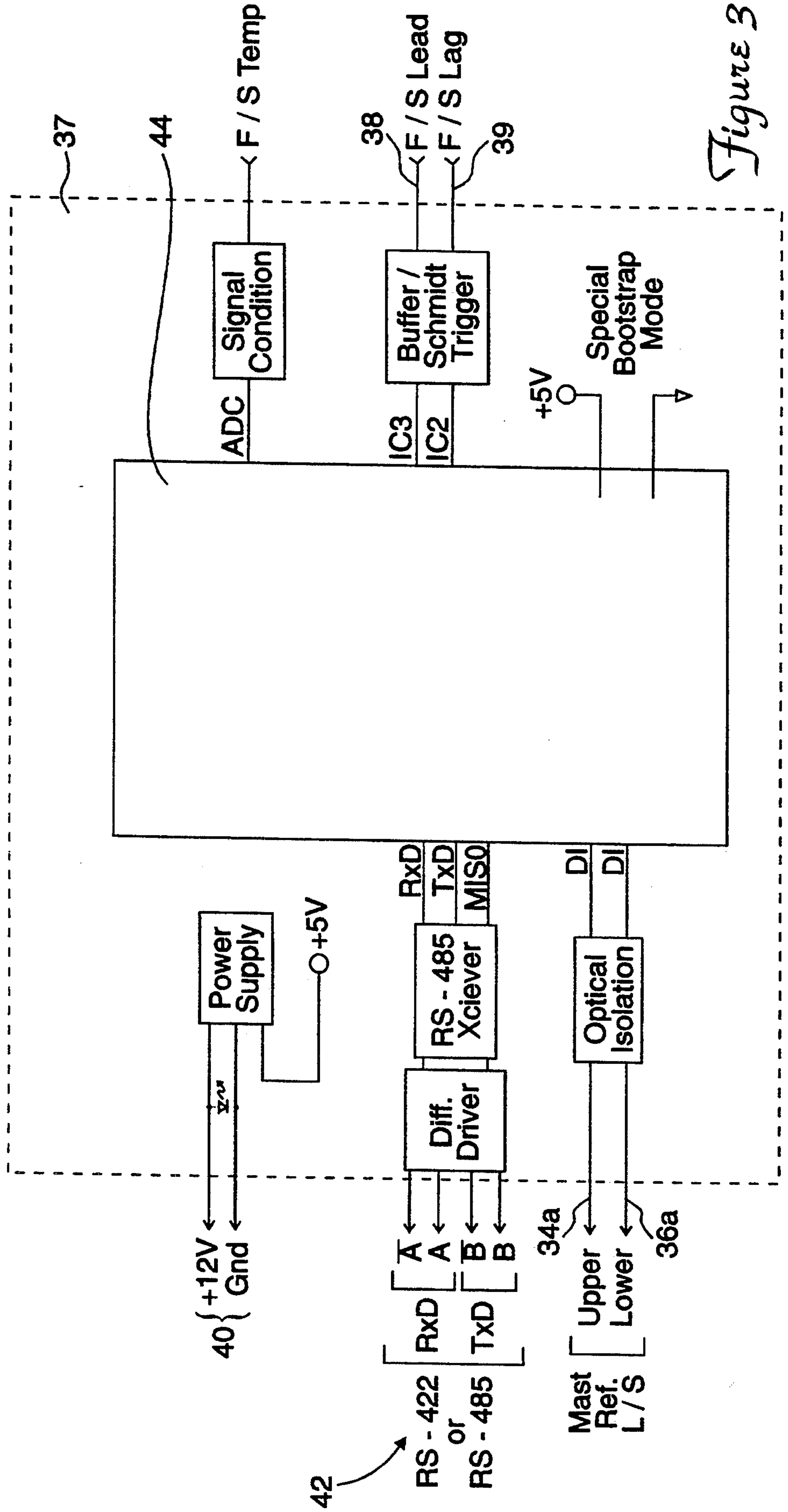
FIG. 3 is a more detailed block diagram of the internal components of the flow sensor control module shown in FIG. 2.

Referring now also to FIG. 3, a block diagram depicts the internal components of control module 37 (FIG. 2) in greater detail. A microcontroller 44 such as manufactured by Motorola Company as Model Nos. 68HC811E2 or 68HC711D3 can be used to control the flow sensor control module 37. The advantage of using the first mentioned microcontroller relates to its electrically erasable characteristics. The latter mentioned microcontroller is not reprogrammable.

Figure 4:
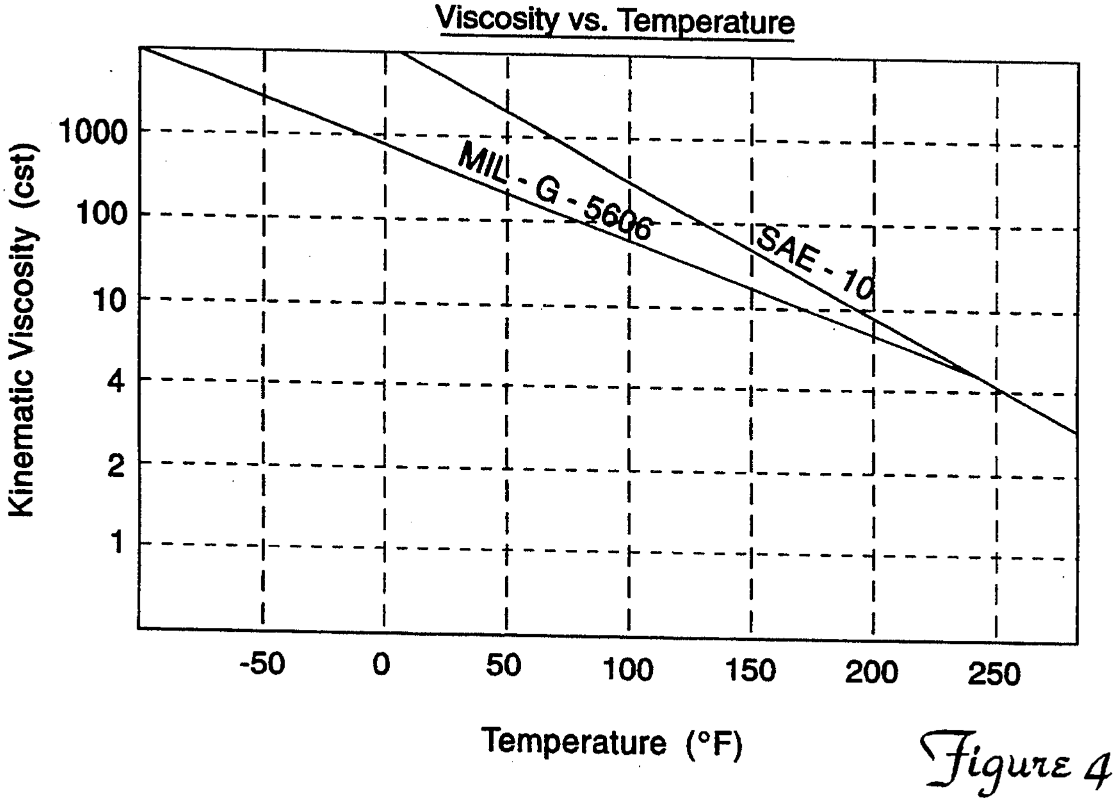
FIG. 4 is a temperature vs. kinematic viscosity chart of a specified oil used in the preferred embodiment.

Referring now to FIG. 4, there is shown a temperature vs. kinematic viscosity chart for the two types & oils: hydraulic fluid MIL G-5606 and SAE 10, which are intended to cover the broad range of applications for this type of vehicle. FIG. 4 is depicted on a log-log scale where temperature (°F.) is shown on the horizontal scale and kinematic viscosity (Cst) is shown on the vertical scale.

Given the measured fluid temperature, kinematic viscosity can be either computed or looked up in accordance with the characteristic Cst vs. temperature relationship shown in FIG. 4. The system is provided with the specific operating oil curve (e.g., SAE 10) upon initialization until and unless a new oil is introduced into the system.

Figure 5:
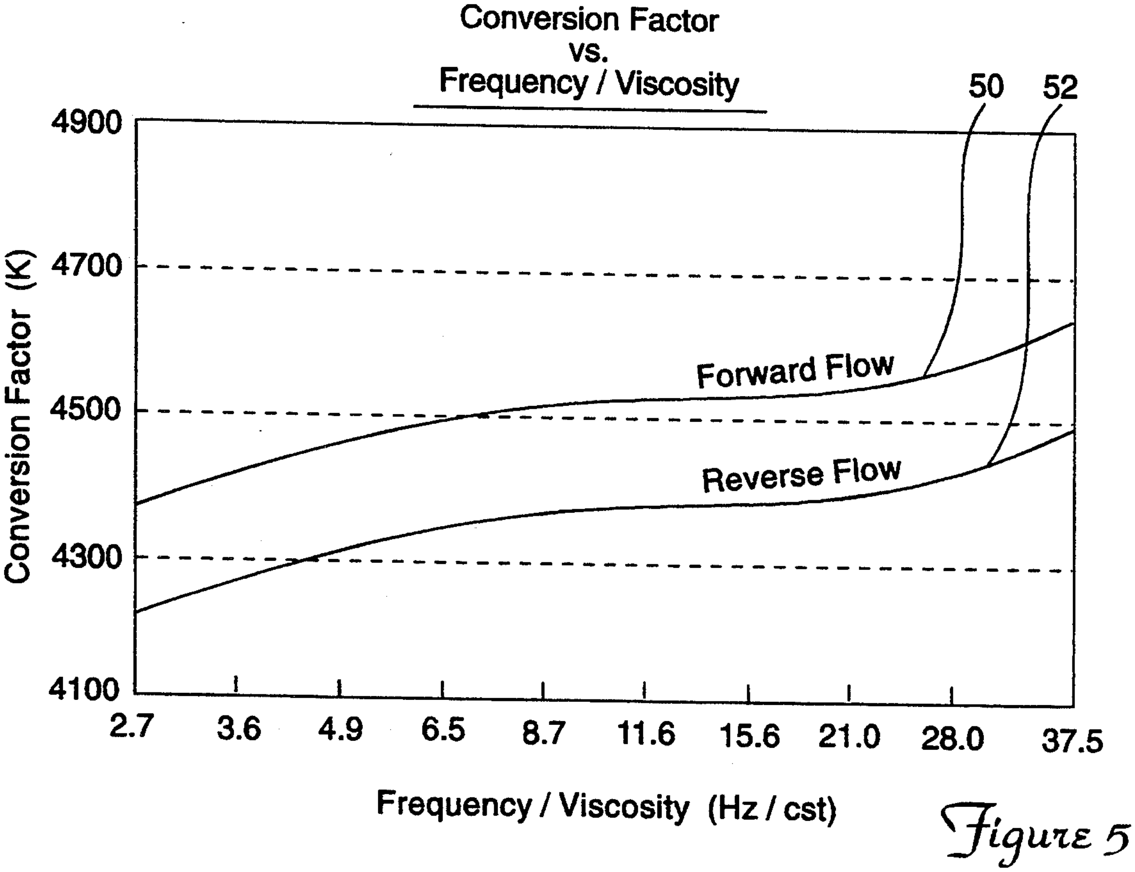
FIG. 5 is a frequency/viscosity ratio vs. conversion factor chart for ascending and descending curves.

Referring now to FIG. 5, a linear-log scale is used to represent the relationship between frequency/kinematic viscosity (Hz/Cst) and conversion factor (K) representing pulses/gallon. A pair of characteristic curves is shown: one for forward flow 50 and the other for reverse flow 52. These two curves are due to the asymmetrical mechanical characteristics of the flow sensor 30 (FIG. 1), which results in dissimilar sensor response characteristics. Given a specific frequency/kinematic viscosity ratio (Hz/Cst), the conversion factor (K) can be either computed or looked up in accordance with the Hz/Cst vs. K curve for the particular fluid flow direction (e.g., forward). Depending upon the hydraulic orientation of the sensor with respect to fluid flow, "forward" could imply ascending and "reverse" could imply descending, with respect to overall computation.

Figure 6:
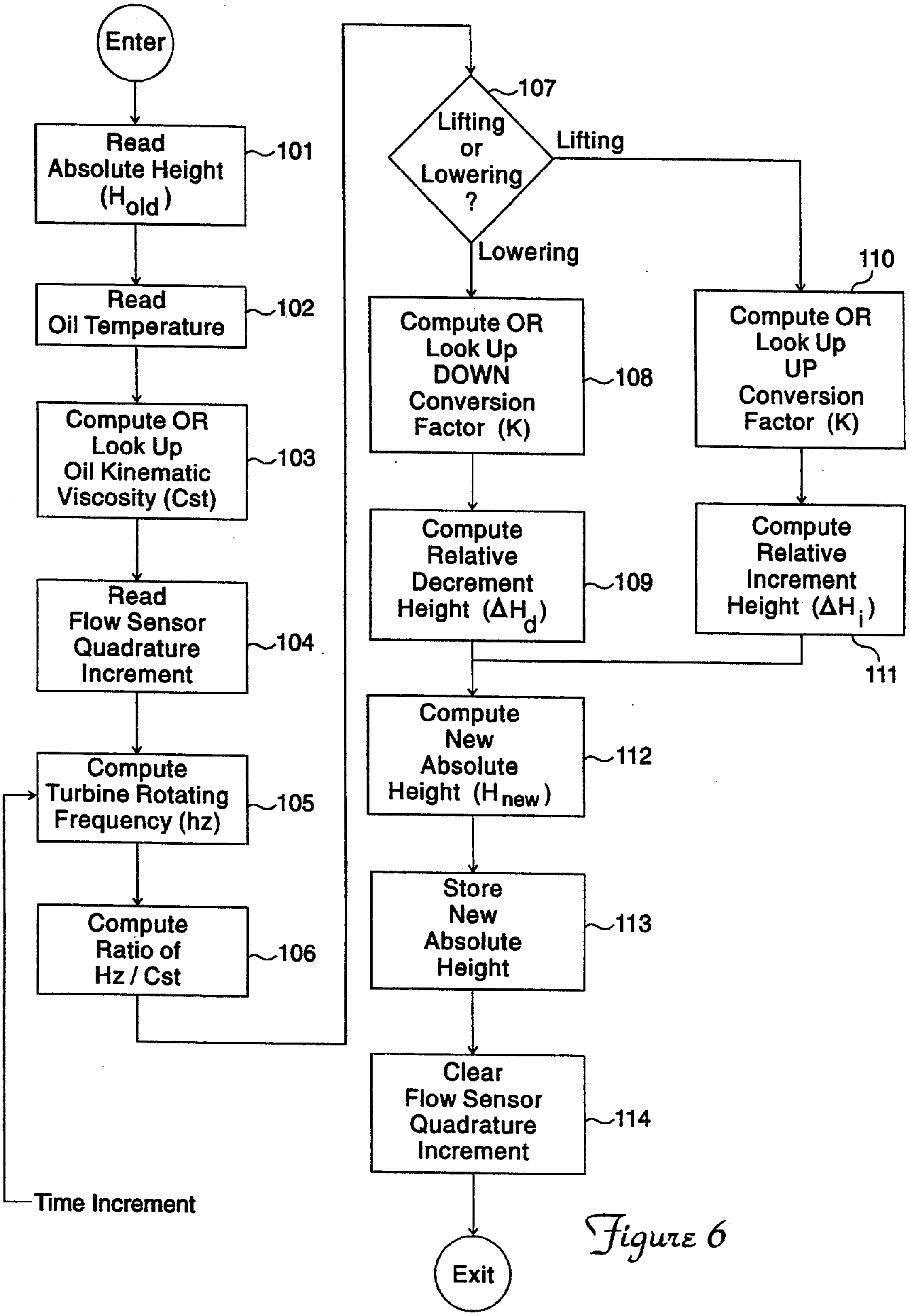
FIG. 6 is the flow chart for the method of the invention.

Referring now also to FIG. 6, a flow chart is depicted that illustrates the method used herein for calculating the carriage height. The subroutine of the vehicle control program for calculating the carriage height is entered and the absolute height ($H_{old}$) is read from storage memory, step 101. Next, a reading of the oil temperature is obtained, step 102. Data representative of FIG. 4 is used to compute or look up the oil kinematic viscosity (Cst), step 103. The incremental quadrature (pulses) of the flow sensor 30 (FIG. 1) is determined at step 104.

Sensor turbine rotating frequency (Hz) is computed, step 105, as follows:

$$Hz = \text{quad pulses} \cdot \frac{\text{revolutions}}{\text{pulse}} \cdot \frac{1}{\text{seconds (cps)}}$$

The ratio of Hz/Cst is then computed, step 106.

The decision is then made as to whether the pulse train is leading (lifting) or lagging (lowering) via decision step 107. If lowering, the "down" conversion factor (K) compensating for Hz/Cst is computed or looked up relative to data representative of FIG. 5, step 108. Having obtained the conversion factor (K), a decremented height value ($\Delta H_d$) is obtained, step 109, for subtraction from the absolute height ($H_{old}$) determined in step 101. On the other hand, if lifting, the "up" conversion factor (K), [step 110], and subsequent incremented height value step ($\Delta H_i$), [step 111], are similarly computed.

The incremental height value ($\Delta H_d$ or $\Delta H_i$) is added to the absolute height ($H_{old}$) determined at step 101, in order to obtain the new absolute height value ($H_{new}$), step 112. The new absolute height value is stored, step 113.

The flow sensor increment memory location is cleared, step 114, to make room for future data. The program is terminated and awaits re-entry.

The current invention provides a more accurate and precise calculation of the carriage height. There exists with the present system and method a better coupling between the mechanical sensing and the electrical output, taking into effect and compensating for operational anomalies in the mechanical sensing devices. Also, the effects of temperature-dependent viscosity upon the determination of the carriage height is addressed for the first time.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. An apparatus for determining the height of a carriage that is movably disposed upon a material handling vehicle, said height being obtained as a function of hydraulic flow rate of fluid utilized to raise and lower said carriage of said vehicle, comprising:

hydraulic moving means for raising and lowering a carriage movably disposed upon a material handling vehicle;

means defining a travel path along which said carriage is raised and lowered;

a source of hydraulic fluid;

pumping means connected to said hydraulic fluid source and to said hydraulic moving means for actuating said hydraulic moving means to raise and lower said carriage;

a flow sensor associated with said pumping means for sensing a flow rate value and direction of said hydraulic fluid when raising and lowering said carriage, and for providing an electrical signal indicative of the flow rate and flow direction, said flow sensor having different forward and reverse flow characteristics, wherein said generated signal is dependent upon fluid flow direction;

conversion means operatively connected to said flow sensor for converting said electrical signal into a height value of said raised or lowered carriage; and a pair of reference switches operatively connected to said flow sensor and said conversion means, and disposed along said travelpath of said carriage for providing said conversion means with a unitary distance factor per electrical signal of said flow sensor.

2. An apparatus for determining the height of a carriage that is movably disposed upon a material handling vehicle, said height being obtained as a function of hydraulic flow rate of fluid utilized to raise and lower said carriage of said vehicle, comprising:

hydraulic moving means for raising and lowering a carriage movably disposed upon a material handling vehicle;

means defining a travel path along which said carriage is raised and lowered;

a source of hydraulic fluid;

pumping means connected to said hydraulic fluid source and to said hydraulic moving means for actuating said hydraulic moving means to raise and lower said carriage;

a flow sensor associated with said pumping means for sensing a flow rate value and direction of said hydraulic fluid when raising and lowering said carriage, and for providing an electrical signal indicative of the flow rate and flow direction, said flow sensor having different fluid temperature dependent flow characteristics, wherein said generated signal is dependent upon fluid temperature;

conversion means operatively connected to said flow sensor for converting said electrical signal into a height value of said raised or lowered carriage; and a pair of reference switches disposed along said travel path of said carriage and Operatively connected to said flow sensor and said conversion means for providing said conversion means With a unitary distance factor per electrical signal of said flow sensor, wherein each of said pair of reference switches is used as a reference point to recalibrate or synchronize said apparatus.

3. An apparatus for determining the height of a carriage movably disposed upon a material handling vehicle, said height being obtained as a function of hydraulic flow rate of fluid utilized to raise and lower said carriage of said vehicle, comprising:

hydraulic moving means for raising and lowering a carriage movably disposed upon a material handling vehicle;

means defining a travel path along which said carriage is raised and lowered;

a flow sensor for sensing a flow rate value and direction of hydraulic fluid when raising and lowering said carriage, and for providing an electrical signal indicative of the flow rate and flow direction;

conversion means operatively connected to said flow sensor for converting said electrical signal into a height value of said raised or lowered carriage; and a pair of reference switches disposed along said travel path of said carriage for providing said conversion means with a unitary distance factor per electrical signal of said flow sensor;

whereby in a learning mode, said switches are used by said conversion means to determine the conversion factor for hydraulic fluid flow relative to said flow sensor.

4. The apparatus for determining the height of a carriage movably disposed on a material handling vehicle in accordance with claim 3, wherein said pair of reference switches is used in the learning mode to determine the conversion factor when said hydraulic fluid flows in the second direction relative to said flow sensor.

5. The apparatus for determining the height of a carriage movably disposed upon a material handling vehicle in accordance with claim 4, wherein said conversion factors generated in said learning mode are used in actual height measurements.

* * * * *